Aug. 30, 1938. B. CLAYTON ET AL Re. 20,838
PROCESS OF BLEACHING OILS
Original Filed June 28, 1937
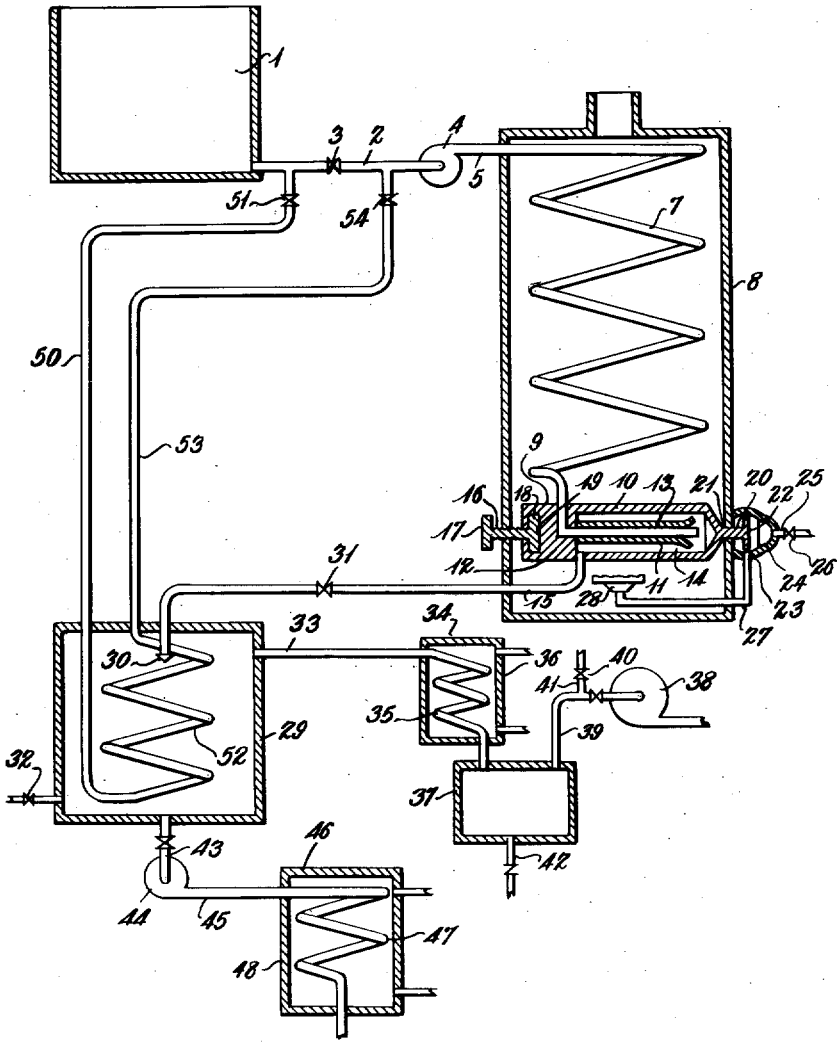
Inventors
Benjamin Clayton and
Benjamin H. Thurman
By Harris, Kiech, Foster & Harris
Attorneys Reissued Aug. 30, 1938

Re. 20,838

UNITED STATES PATENT OFFICE 20,838

PROCESS OF BLEACHING OILS

Benjamin Clayton, Houston, Tex., and Benjamin H. Thurman, Bronxville, N. Y., assignors to Refining, Inc., Reno, Nev., a corporation of Nevada Original No. 2,110,789, dated March 8, 1938, Serial No. 150,824, June 28, 1937. Application for reissue May 21, 1938, Serial No. 209,390

17 Claims. (Cl. 260—428)

This invention relates to a process of bleaching glyceride oils and more particularly to a process of continuously bleaching such oils by subjecting them to elevated temperatures. The present application is a continuation in part of our copending application, Serial No. 695,632, filed October 28, 1933.

Crude glyceride oils, such as animal, vegetable and fish oils, usually contain various impurities, for example, fatty acids, coloring matter and gums. The fatty acids and gums can be almost completely removed by refining processes employing caustic soda or other alkaline refining agents. Such refining processes ordinarily include the mixing of proper proportions of a caustic soda solution with the oil so that alkali reacts with the free fatty acids to form soap and the separation of the resultant soap from the oil. Most of the gums present separate with the soap and if the refining process is properly conducted a large part of the coloring matter is likewise separated with the soap. The refining process may be continuous or batch and the soap, along with other impurities, separated from the refined oil by centrifugal separation or settling.

The refined oil from the above described process usually contains small amounts of soap, water, and free alkali. If the soap and free alkali are present in appreciable quantities they can be removed by washing with water, as by mixing water with the oil either in a batch or continuous process and then separating the water in which the alkali and soap are dissolved by either a centrifugal or settling operation.

In many instances the refining operation leaves the oil, too highly colored for an acceptable commercial product and it has been the practice in the art to treat this oil with a bleaching agent as by mixing such bleaching agents as fuller's earth, acid treated clay or finely divided carbon with the oil and then filtering the bleaching agent from the oil. This method of bleaching or removin the final color is expensive as large filter presses and large quantities of bleaching agents are required. Also a considerable proportion of the oil is lost by being retained in the bleaching agent and discarded therewith. The present invention provides a process which may be employed in lieu of the conventional processes employing bleaching agents or in case the oil is extremely highly colored, it may be employed in addition to treatment with bleaching agents. In the latter case both the amount of bleaching agent and the amount of oil lost in the process are markedly reduced.

Also, in addition to the impurities discussed above, glyceride oils, in many cases, contain volatile and other impurities which are not removed by the above described refining process or in the washing and bleaching steps of the prior art. Certain of these impurities give the resultant oil an objectionable odor and flavor or deleteriously affect the keeping qualities of the oil. These impurities can be removed by vaporization in the present process or broken down into other compounds, which are not objectionable by the temperatures employed. Thus, the oil may be deodorized and improved in flavor and keeping qualities, as well as bleached, by the present invention. If a crude oil is relatively pure or the nature of its intended use does not require a highly refined oil, the present invention may be applied to such a crude oil to reduce its color and remove other objectionable impurities, but the invention finds its greatest utility in bleaching previously refined oils.

It is, therefore, an object of the present invention to provide an improved process of bleaching glyceride oils.

Another object of the invention is to provide an improved process of bleaching previously refined glyceride oils.

Another object of the invention is to provide an improved process of bleaching glyceride oils in which no bleaching agents are required.

A further object of the invention is to provide a continuous process of bleaching glyceride oils in which the oil is subjected to elevated temperatures out of contact with the air and cooled before being brought again in contact with the air.

A still further object of the invention is to provide an improved process of bleaching glyceride oils and at the same time removing vaporizable and other impurities.

In accordance with the present invention, the glyceride oil is passed continuously through a heating zone where its temperature is rapidly raised and wherein it is maintained out of contact with the atmosphere. The temperatures contemplated by the present invention are, in general sufficiently high that contact with the atmosphere by the heated oil would cause deterioration of the oil. When the desired temperature of the oil has been reached, the oil is quickly cooled to a temperature at which it will not be deleteriously affected by contact with the atmosphere by being passed through a cooling zone before it is discharged into contact with the atmosphere.

The temperatures to which the oil is subjected cannot be precisely stated since they will vary with the type of oil being treated and the amount of bleaching necessary for a particular oil. For a linseed oil or soya bean oil this temperature may reach 500 to 600° F. while for cottonseed, corn, sesame or other of the more edible oils, temperatures between 420 and 500° F. are usually sufficient. If a slight bleaching only is required, it will be apparent that the temperature to which a given oil is subjected may be somewhat lower.

The bleaching of the oil appears to be a function of the temperature reached and it is not necessary to maintain the oil at the high temperature over a period of time. If the oil is maintained at such high temperature for an extended period of time, polymerization, as well as cracking, may occur with an increase of fatty acid content and the production of an undesirable flavor and darkening of the oil so that satisfactory bleaching is not accomplished. It is, therefore, desirable to heat the oil as rapidly as possible and then cool the oil as rapidly as possible.

The pressure in the heating zone will ordinarily be only that necessary to force the oil through the zone since high pressure is not necessary for the present bleaching process and it is furthermore not necessary to prevent vaporization of all of the more volatile constituents of the oil or water contained therein. In some instances it may, however, be desirable to maintain sufficient pressure in the heating zone to prevent substantial vaporization therein as the oil may be somewhat more rapidly heated when no vapors are formed in the heating zone. Furthermore, the vaporization of water or volatiles not vaporized in the heating zone may be employed after the oil is discharged from the heating zone to rapidly cool the oil. To further this effect the oil may be discharged from the heating zone into a chamber maintained at a lower pressure than the heating zone and in some instances the employment of a vacuum chamber is found to be desirable. Even if vaporization has been allowed to occur in the heating zone, discharging the heated oil into a lower pressure, or vacuum chamber will cause further vaporization of volatiles and expansion of those already formed so as to cool the oil. With certain oils it has been found that a better bleach is produced by entirely preventing vaporization in the heating zone while with other oils it has been found desirable to employ a sufficiently low pressure in the heating zone to provide for vaporization therein. Aside from the cooling effect of vaporization in cooling the oil after it is discharged from the heating zone, a portion of the coloring matter appears to be removed with the vapor along with other vaporizable impurities contained in oil so that it is desirable to withdraw vapors from the oil while it is in a heated condition or during cooling thereof. Either saturated or superheated steam may be introduced into the expansion chamber to assist in the vaporization of the volatiles and with certain oils it has been found that a better bleach is produced by the presence of small proportions of water in the oil when it is introduced into the heating zone. This water may either be that remaining in the oil after the oil has been refined or after being washed as above described, or additional water may be introduced into the oil before it is heated. Thus, with cerating oils the present process may also operate to dry the oils and it is unnecessary to employ a separate drying step. With other oils it has been found desirable to heat them in the absence of moisture in which case a dry oil is employed or the oil is dried before it is heated.

The oil may be further cooled before discharging the same to the atmosphere by being passed in heat exchange relation with a cooling medium either in the expansion chamber or in an additional chamber so that the temperature of the oil is below that at which oxidation or other deleterious action occurs when it is again contacted with the atmosphere.

A diagrammatic drawing of an apparatus suitable for carrying out the present process is shown in the single figure of the attached drawing and the process will be described in more detail in connection therewith.

Referring more particularly to the drawing, 1 indicates a tank for receiving the oil to be bleached, which oil may be either a crude oil or a previously refined oil. As stated above, this oil may be either dry or may contain small portions of water depending upon the type of oil being treated. The oil is withdrawn from tank 1 through a pipe 2 in which is positioned a control valve 3 and is forced by a pump 4 through a pipe 5 connected to the inlet of a heating coil 7 positioned in a heater casing 8. The oil leaving the coil 7 is delivered to the interior of a thermostat or heat regulator assembly 9 which comprises a hollow member 10 enclosing a tube 11 secured to the closed end 12 of the hollow member 10. The other end 13 of the tube 11 is open and is slitted and spread so that the ends of the spread portions contact with the inside surface of the hollow member 10 leaving openings for the oil to pass through the tube 11 into an annular space 14 between the tube 11 and the interior surface of the hollow member 10. The oil is discharged from the hollow member 10 through pipe 15 which leads from the heat regulator 9 to the exterior of the heater casing 8.

One end of the heat regulator 9 is held in adjusted position by the thread support 16 passing through a correspondingly threaded opening in the wall of the heater casing 8. A hand wheel 17 is provided at the outer end of the support 16 and the interior end of the support 16 terminates in an enlargement 18 rotatable in a recess 19 provided therefor in the closed end 12 of the hollow member 10. By turning the hand wheel 17 the heat regulator 9 can be moved longitudinally to adjust the temperature of the oil leaving the heating coil 7 as will be hereinafter described.

The end of the hollow member 10 opposite the support 16 is provided with a stem or extension 20 which extends through an opening 21 in the wall of the heater casing 8. A fuel valve 22 is fixed on the outer end of the stem 20 and is positioned in the valve housing 23 attached to the wall of the heater casing 8. The valve housing 23 is provided with a valve seat 24 which cooperates with the valve 22 to control the supply of a fluid fuel, such as oil or gas, from fuel pipe 25. A manually operable shut off valve 26 is positioned in the pipe 25 to provide for starting and shutting down the operation of the heater. The amount of fuel delivered to the heater is controlled by the valve 22 and the controlled amount of fuel is conducted by a pipe 27 to a burner 28 positioned below the heat regulator or thermostat assembly 9 so that products of combustion from the burner 28 contact with both the heat regulator 9 and the heating coil 7. It will be noted that the heated oil from the coil 7 also contacts the hollow member 10 and that thermal expansion of this member in a longitudinal direction tends to close the valve 22 upon increase of temperature of the hollow member 10. The temperature of the hollow member 10 and therefore the amount of fuel fed to the burner 28 depends both upon the temperature of the products of combustion and the temperature of the oil leaving the coil 7. It has been found that this arrangement automatically maintains an extremely uniform discharge temperature of the oil leaving the coil 7 and that this uniform discharge temperature may be predetermined by adjustment of the hand wheel 17. Also in case of failure of the oil supply to coil 7, the hollow member 10 is rapidly heated to shut off supply of fuel before damage due to high temperature occurs to the heater casing 8 or the elements enclosed therein.

Pipe 15 delivers the oil discharged from the heat regulator 9 to an evaporating or expansion chamber 29 and terminates therein in a discharge nozzle 30. A valve 31 may be positioned in the pipe 15 so that any desired pressure in the heating coil may be imposed by the pump 4 and maintained by partially closing this valve. Alternatively the nozzle 30 may be made replaceable so that nozzles having different sized discharge openings may be substituted to maintain the desired pressure or the diameter of the pipe 7 of the coil may be made sufficiently small so that the desired pressure is maintained without the necessity of a restricted discharge.

A steam supply pipe 32 may be provided for introducing either saturated or superheated steam into the expansion chamber 29 to assist in vaporization or add addititonal heat in the expansion chamber 29. Vapors are withdrawn from the expansion chamber 29 by a pipe 33 leading to a condenser 34. The condenser may be of any suitable type and may include a cooling coil 35 connected to pipe 33 and positioned in a casing 34, through which a cooling medium may be circulated. The condenser coil 35 may discharge into a receiver 37 to which a vacuum pump 38 is connected by a pipe 39. If evaporation and condensation at atmospheric pressure is desired, the receiver 37 may be vented directly to the atmosphere by opening the valve 40 in the pipe 41. Condensate may be removed from the receiver 37 through a pipe 42 and a pump (not shown) may be employed for this purpose, when a vacuum is maintained in receiver 37.

A valved discharge pipe 43 leads from the bottom of the expansion chamber 29 and is connected to a pump 44 for withdrawing the treated oil from the expansion chamber and discharging the same through a pipe 45 to a cooling device 46 which may include a coil 47 positioned in a chamber 48 through which a cooling medium may be passed. An effective manner of conserving heat in the process is to employ the oil being delivered to the heating coil 7 as a cooling medium for cooling the oil in the expansion chamber 29. This can be accomplished when high temperatures in the expansion chamber are not required by flowing all or a portion of the oil entering the process through the pipe 50 provided with a valve 51 and connected to the pipe 2 between the tank 1 and the valve 3 and then through a cooling coil 52 positioned in the expansion chamber 29 and returning the oil through a pipe 53 and valve 54 to the pipe 2 between the valve 3 and the pump 4. By closing or partially closing the valve 3 and opening or partially opening the valves 51 and 54 any desired portion of the oil from the tank 1 can be run through the cooling coil 52 so as to preliminarily heat the oil entering the coil 7 and cool the oil in the expansion chamber 29.

The rate at which the oil is passed through the coil 7 as well as the amount of heat applied to the coil will usually be different for different oils being treated since the temperatures suitable for different oils will vary as above discussed. By setting the hand wheel 17, the discharge temperature of the oil is maintained substantially constant by the automatic heat regulator 9 at any desired temperature. It is, of course, understood that any other means of rapidly heating the oil such as a steam or liquid heating bath may be employed instead of using products of combustion directly in contact with the heating coil.

By this invention, glyceride oils are treated in such a way that they are bleached very effectively and efficiently and in an economical manner. It requires only a very few minutes, for example, four to ten minutes, to increase the temperature of the oil from room temperature or the temperature at which it is discharged from the previous refining or other steps to the temperature required to bleach the oil. This short time of heating and the fact that the oil is maintained out of contact with the atmosphere while it is in a highly heated condition prevent injuring the oil. Also the velocity of the oil through the coil 7 is such that substantially uniform heating is accomplished, that is, at least mild turbulence is produced, no local overheating occurs and the oil may be heated to a relatively high temperature without burning. The present process is entirely continuous and supersedes or operates in conjunction with the prior art practices of mixing a decolorizing material or other filter aid with the oil and then filtering the same. As a specific example of the present invention, a previously refined cottonseed oil having an original color of 37 yellow, 7 red was bleached in a few minutes to a color of 30 yellow, 3 red without employing any bleaching agents.

By testing samples of the oil to be treated, the art can readily ascertain whether to heat the oil in a dry condition or with small proportions of water and also the necessary temperature reached in the heating coil. With extremely difficult oils to bleach, the present process may be preceded or followed by a conventional bleaching step employing bleaching agents such as fuller's earth or carbon. However, even in such cases, the loss of oil as well as the amount of bleaching agent required is markedly reduced by employing the present invention as a part of the bleaching operation. Volatile impurities are removed by expanding the heated oil into the closed chamber 29. Such volatile impurities can be condensed and collected in the receiver 37 and in many cases constitute valuable by-products. When it is not desired to operate the expansion chamber 29 under vacuum conditions or to recover the volatile impurities the condenser 34 and receiver 37 can be omitted.

Although the present invention has particular utility in bleaching glyceride oils which have been previously refined there are certain glyceride oils which, because of the nature of their use or their excellent quality in a crude state, do not require refining but nevertheless should have their color reduced. The present invention is applicable to such oils even though they have not been previously refined and is effective to reduce the color thereof. No reagents such as alkali or bleaching agents are required and the oil is subjected merely to heating and cooling out of contact with the atmosphere. For example, linseed oil which has been cold pressed and which has not been neutralized and refined with alkali as well as linseed oils which have been refined may be bleached to colors of 20 yellow, 2 red or less.

Although we have described the preferred embodiment of our invention, it is to be understood that the present invention is not to be limited to the precise details of the process herein disclosed but may be varied within the scope of the following claims.

What we claim is:

1. The process of bleaching previously refined animal and vegetable oils which are substantially free of free fatty acids, which comprises, passing said oils under pressure and out of contact with the air through a heated zone of such dimensions that the oil is substantially uniformly heated, raising the temperature of said oil in said zone sufficient to reduce the color of said oil and cause volatile constituents to pass into vapor when the pressure is lowered, cooling said oil before the viscosity characteristics thereof have been materially changed by suddenly lowering the pressure and withdrawing said volatile constituents.

2. The process of bleaching previously refined animal and vegetable oils which are substantially free of free fatty acids, which comprises, passing said oils at an elevated pressure and out of contact with the air through a heated zone of such dimensions that the oil is substantially uniformly heated, raising the temperature of said oil in said zone sufficient to reduce the color of said oil and cause volatile constituents to pass into vapor when the pressure is released, cooling said oil before the viscosity characteristics thereof have been materially changed by suddenly releasing said pressure and withdrawing said volatile constituents and further cooling said oil before bringing the same into contact with the air.

3. The process of bleaching previously refined animal and vegetable oils which are substantially free of free fatty acids, which comprises, passing said oils under pressure through a heated zone and out of contact with the air, maintaining sufficient velocity of said oil in said zone to cause the oil to be substantially uniformly heated, raising the temperature of the oil in said zone sufficient to reduce the color of said oil and cause volatile constituents thereof to pass into vapor when the pressure is reduced, suddenly releasing said pressure to cool said oil before the viscosity characteristics of said oil have been materially changed by delivering the oil into a lower pressure zone and withdrawing said volatile constituents.

4. The process of bleaching previously refined animal and vegetable oils which are substantially free of free fatty acids, which comprises, passing said oils at an elevated pressure and out of contact with the air through a heated zone of such dimensions that the oil is substantially uniformly heated, raising the temperature of said oil in said zone to approximately 500° F., cooling said oil before the viscosity characteristics thereof have been materially changed by suddenly releasing the pressure and withdrawing volatile products therefrom.

5. The process of bleaching previously refined animal and vegetable oils which are substantially free of free fatty acids, which comprises, passing said oils through an elongated curved heated zone at a temperature sufficient to reduce the color of the oil and at an elevated pressure sufficient to limit volatilization of constituents thereof while excluding air therefrom, cooling said oil before the viscosity characteristics thereof have been materially changed by suddenly releasing the pressure and withdrawing volatile constituents.

6. The process of bleaching previously refined glyceride oils which are substantially free of free fatty acids and removing volatile impurities therefrom, which comprises, passing said oils under pressure and out of contact with the air through a heated zone of such dimensions that the oil is substantially uniformly heated, raising the temperature of said oil in said zone sufficient to reduce the color of said oil and cause volatile impurities to pass into vapor when the pressure is lowered, cooling said oil before the viscosity characteristics thereof have been materially changed by suddenly lowering the pressure and withdrawing said volatile impurities.

7. The process of bleaching previously refined glyceride oils which are substantially free of free fatty acids and removing volatile impurities therefrom, which comprises, passing said oils under pressure and out of contact with the air through a heated zone of such dimensions that the oil is substantially uniformly heated, raising the temperature of said oil in said zone sufficient to reduce the color of said oil and cause volatile impurities to pass into vapor when the pressure is lowered, cooling said oil before the viscosity characteristics thereof have been materially changed by suddenly discharging said oil into a vacuum zone and withdrawing said volatile impurities from said vacuum.

8. The process of bleaching previously refined glyceride oils which are substantially free of free fatty acids and removing volatile impurities therefrom and recovering the same, which comprises, passing said oils under pressure and out of contact with the air through a heated zone of such dimensions that the oil is substantially uniformly heated, raising the temperature of said oil in said zone sufficient to reduce the color of said oil and cause volatile impurities to pass into vapor when the pressure is lowered, cooling said oil before the viscosity characteristics thereof have been materially changed by suddenly lowering the pressure and withdrawing said volatile impurities and condensing the same.

9. The process of bleaching previously refined glyceride oils which are substantially free of free fatty acids, which comprises, passing said oils containing a small proportion of water under pressure and out of contact with the air through a heated zone of such dimensions that the oil is substantially uniformly heated, raising the temperature of said oil in said zone sufficient to reduce the color of said oil and cause volatile constituents, including said water, to pass into vapor when the pressure is lowered, cooling said oil before the viscosity characteristics thereof have been materially changed by suddenly lowering the pressure and withdrawing said volatile constituents.

10. A continuous process of bleaching previously refined animal and vegetable oils which are substantially free of free fatty acids, which comprises passing said oils out of contact with the air through a heated zone of such dimensions that the oil is substantially uniformly heated, raising the temperature of the oil in said zone sufficient to reduce the color of said oil and to cause volatile constituents to be separated as vapors when said oil is delivered into a vapor separating zone, delivering said oil into said evaporating zone, withdrawing said vapors at a rate sufficient to maintain a vacuum in said zone, withdrawing said oil from said zone and continuously cooling the oil before the viscosity characteristics thereof have been materially changed and before contact with the air.

11. The process as defined in claim 10 in which steam is introduced into said vapor separating zone to assist in separation of volatiles from said oil.

12. The process as defined in claim 10 in which water vapor is present in the heated zone.

13. The process of bleaching previously refined animal and vegetable oils which are substantially free of free fatty acids, which comprises, passing said oils under pressure and out of contact with the air through a heated zone of such dimensions that the oil is substantially uniformly heated, raising the temperature of said oil in said zone sufficient to reduce the color of said oil and cause volatile constituents to pass into vapors when the pressure is lowered, lowering the pressure and withdrawing said volatile constituents, and cooling the oil before the viscosity characteristics thereof have been materially changed.

14. A continuous process of bleaching previously refined animal and vegetable oils which are substantially free of free fatty acids, which comprises, continuously passing said oils out of contact with the air through a heated zone and during their passage therethrough raising the temperature sufficient to cause volatile constituents to be separated as vapors when said oil is delivered to a vapor separating zone, delivering said oil into said vapor separating zone maintained under sufficiently low pressure conditions to separate the volatile constituents in vapor form from said oil, continuously withdrawing said vapors, and cooling said oil before the viscosity characteristics thereof have been materially changed.

15. The process defined in claim 14 in which the temperature of the oil is raised to at least 420° F. during its passage through the heated zone.

16. The process as defined in claim 14 in which the oil being bleached is substantially free of auxiliary bleaching agents.

17. A continuous process of reducing the color and odor of previously refined animal and vegetable oils which are substantially free of free fatty acids by continuously removing vaporizable impurities from said oils which comprises continuously passing said oils out of contact with the air through a heated zone and during their passage therethrough maintaining a pressure sufficiently low and raising the temperature sufficiently high to cause vaporization of vaporizable impurities in said heating zone, delivering the oil and vapors into a vapor separating zone maintained under sufficiently low pressure conditions to separate vaporizable impurities in vapor form from said oil, continuously withdrawing said vapors, continuously withdrawing the oil from said vapor separating zone and cooling the same before the viscosity characteristics thereof have been materially changed and before contact with the air.

BENJAMIN CLAYTON.
BENJAMIN H. THURMAN.